(12) United States Patent
Giovanni

(10) Patent No.: US 6,488,060 B1
(45) Date of Patent: Dec. 3, 2002

(54) WOODWORKING TOOLING MACHINE, CAPABLE OF PROCESSING ITEMS OF VARIABLE SIZE AND COMPLEX SHAPE, AND THE RELATIVE METHOD

(75) Inventor: Sella Giovanni, Thiene (IT)

(73) Assignee: Essetre di Sella Giovanni, Thiene (IT)

( * ) Notice: Subject to any disclaimer, the term of this patent is extended or adjusted under 35 U.S.C. 154(b) by 22 days.

(21) Appl. No.: 09/633,810

(22) Filed: Aug. 7, 2000

(30) Foreign Application Priority Data

Aug. 9, 1999 (IT) .......................... MI99A1796

(51) Int. Cl.$^7$ ................................. B27C 9/00
(52) U.S. Cl. ............... 144/2.1; 144/135.2; 144/242.1; 144/245.1; 269/21; 269/25; 269/56; 409/164; 409/225; 409/229
(58) Field of Search ................. 144/2.1, 242.1, 144/135.2, 245.1; 409/163, 164, 219, 225, 229; 269/20, 21, 25, 55, 56, 59, 73, 74, 82

(56) References Cited

U.S. PATENT DOCUMENTS

| | | | | |
|---|---|---|---|---|
| 3,593,459 A | * | 7/1971 | Kulischenko | 269/56 |
| 3,827,683 A | * | 8/1974 | Seborg et al. | 269/56 |
| 5,457,868 A | * | 10/1995 | Blaimschein | 269/21 |
| 5,582,397 A | * | 12/1996 | Lanvin | 269/25 |
| 5,700,117 A | * | 12/1997 | Sella | 409/164 |
| 5,842,690 A | * | 12/1998 | Lee et al. | 269/21 |
| 6,206,352 B1 | * | 3/2001 | Ishitani et al. | 269/21 |

* cited by examiner

Primary Examiner—W. Donald Bray
(74) Attorney, Agent, or Firm—Young & Thompson

(57) ABSTRACT

This invention refers to a woodworking machine equipped with fastening devices capable of allowing the processing of items of complex shape and variable size, characterized in that it provides a multiple number of devices which are mobile and capable of being positioned on a working plane independently from each other, where each of said devices simultaneously constitutes both a striking element for positioning the item and a blocking element for the same.

6 Claims, 4 Drawing Sheets

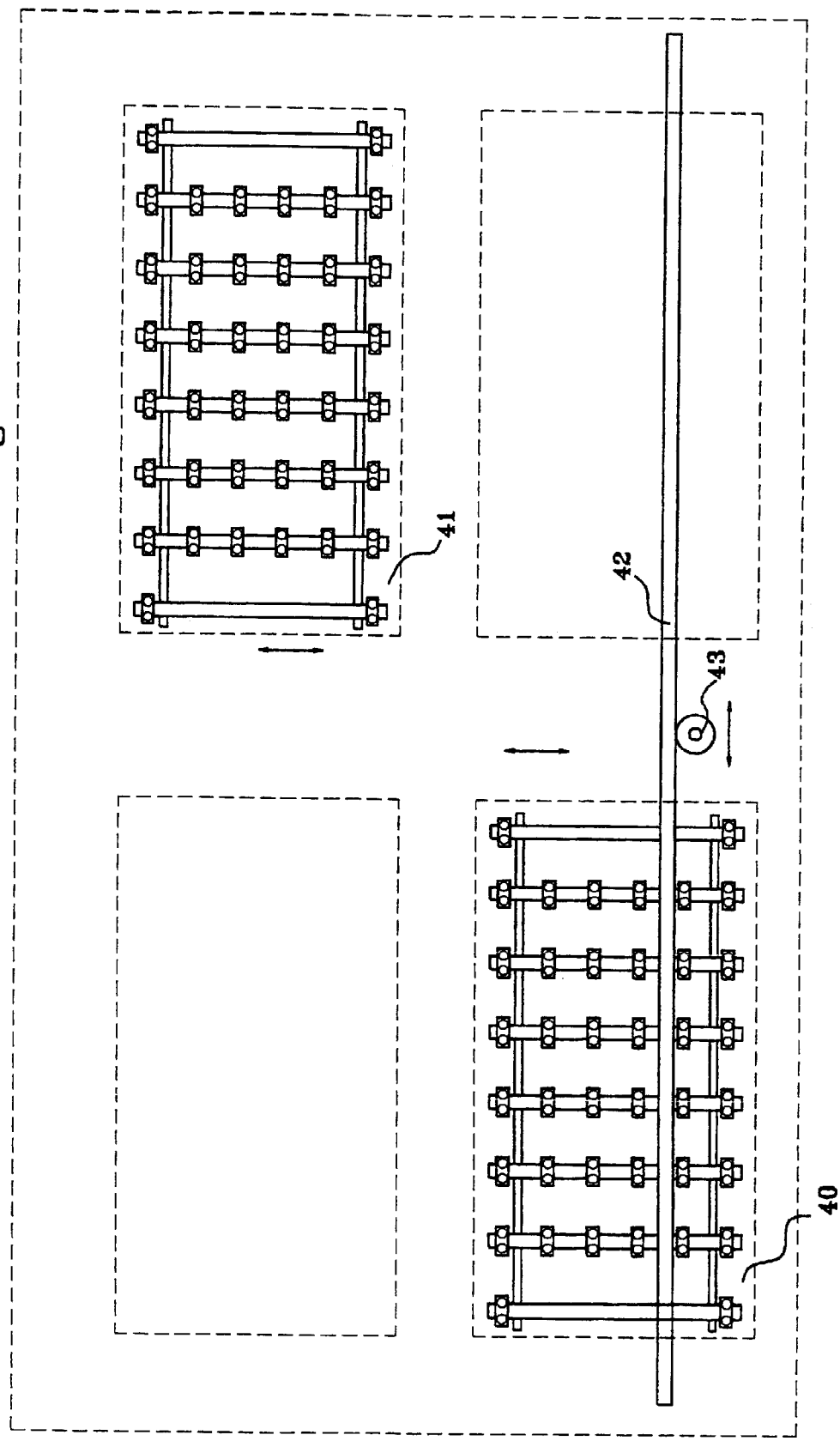

WOODWORKING TOOLING MACHINE, CAPABLE OF PROCESSING ITEMS OF VARIABLE SIZE AND COMPLEX SHAPE, AND THE RELATIVE METHOD

FIELD OF THE INVENTION

This invention offers a woodworking tooling machine capable of processing items of variable size and complex shape, as well as the relative new method. The machine according to the invention comprises a multiple number of item blocking devices, capable of also acting as stops for the same, where each of said units is mobile and capable of being positioned at will along the working plane.

The method according to the invention provides for positioning a first series of said units, arranging the item to be processed against said stops, blocking it at one or more sides and performing the processing on the free sides, then moving additional devices to block the item at the processed sides, removing the initial blocking devices, and completing the processing on the remaining side. This system allows the machine to be quickly and easily adapted to the processing of items of any shape, thus achieving an extremely flexible machine, capable of drastically reducing the dead moments needed on the known machines for preparing them to process new items.

BACKGROUND OF THE INVENTION

It is known that a correct positioning of the item to be processed is of fundamental importance in the processing done by tooling machines.

Various systems for positioning and blocking an item are known, system which vary depending on the type of processing to be performed.

U.S. Pat. No. 5,700,117 by the same applicant described a tooling machine for the processing of panels where the working plane comprises a pair of guides arranged along a first axis, on which a multiple number of guides are sliding and each carrying one or more mobile fastening devices mounted on the cross beam along an axis set at an orthogonal direction with respect to that of the previous axis.

As mentioned above in these known machines the items is fastened by placing the item on suction-cup elements connected to aspirating devices capable of creating a vacuum inside the suction cup, so as to block the panel during the processing step. This system, while suitable for panels, presents however a few limitations whenever the processing is to be done on items of limited width and of complex shape, which need to be processed on all sides and which are difficult to position and block on the working plane.

The limitations of the known machines are in particular evidence whenever the type of processing needs to be frequently changed, because of the dead moments needed for preparing the working plane and the relative stops, whenever the item to be processed is to be changed.

SUMMARY OF THE INVENTION

In order to overcome this problem this invention offers a woodworking tooling machine equipped with a working plane comprising a pair of guides arranged along a first axis, a series of mobile cross beams oriented along an axis orthogonal to the previous one, a multiple number of supports capable of sliding along said cross-beams, each carrying a pair of item striking and blocking devices, where each striking and blocking device comprises a pressing device and some suction devices controlled independently from each other. Each support of the blocking devices presents a seat capable of being engaged by an element mounted on the machine's operating head, which can thus be utilized for positioning the support on the working plane.

According to an alternative version of the invertion, the working planes are two and the device for the positioning of the supports is capable of engaging said seats into the supports which are freely mobile along a first axis, while the working planes are mobile along an axis orthogonal to the previous one.

The combination of these two motions makes it possible to place the supports on a working plane, while the operating head performs the operation on the other plane.

BRIEF DESCRIPTION OF THE DRAWINGS

This invention will now be described in detail, for exemplifying and non limiting purposes, with reference to the attached figures in which:

FIG. 4 is; a simplified view of the working planes with the item positioning devices in an alternative embodiment of the invention.

DETAILED DESCRIPTION OF THE INVENTION

Figure 1:
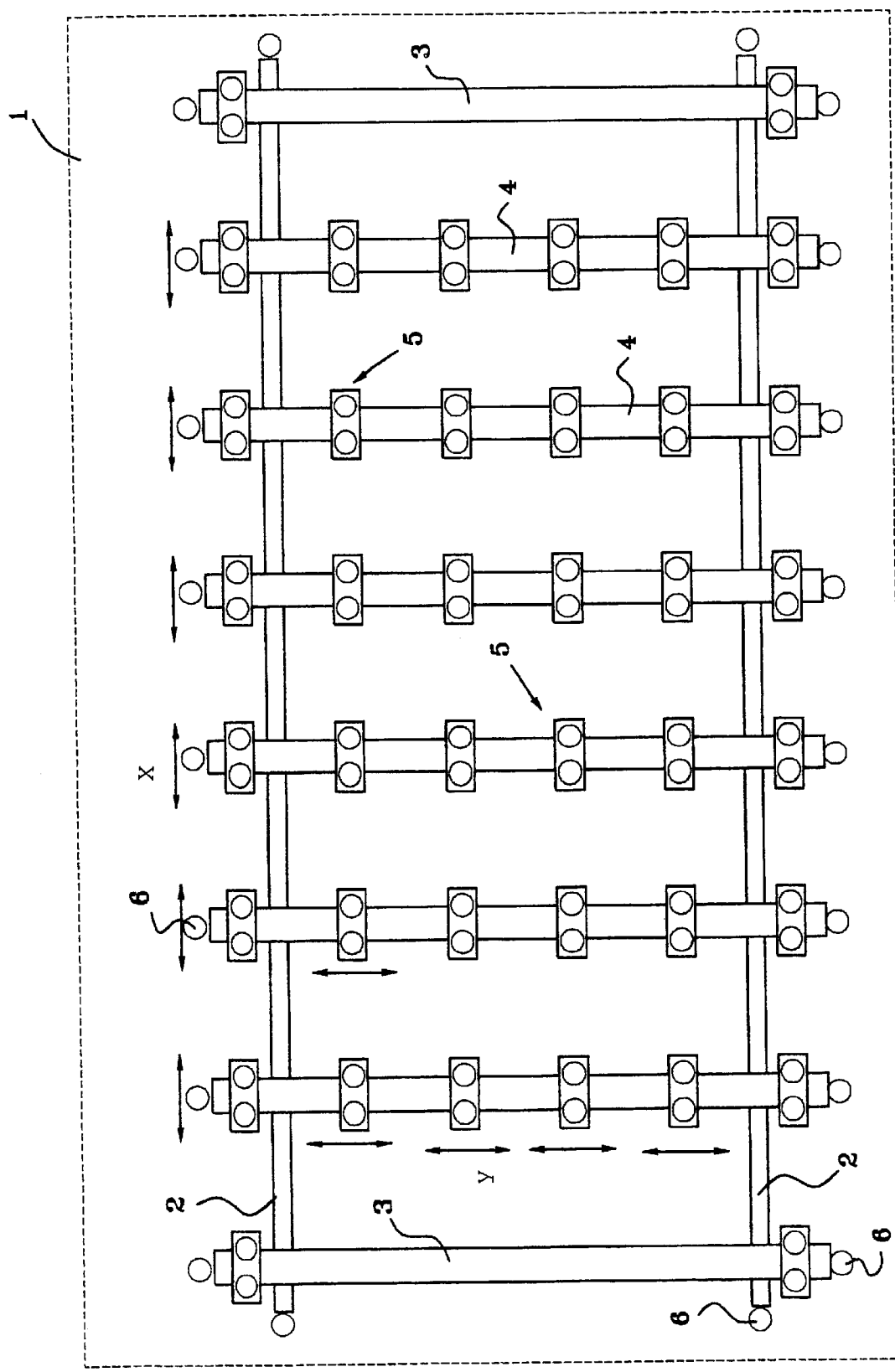
FIG. 1 offers a simplified topside view of a working plane of a machine according to the invention.

With reference to FIG. 1, the number 1 indicates the working plane of a tooling machine, above which moves an operating head not shown in the figure as it is of a known type, equipped with one or more electrical spindles and set so as to be freely moving along a triplet of Cartesian axes in order to perform the various processing operations.

The working plane 1 comprises a pair of guides 2 arranged along an axis, for instance along the axis X, which mount a pair of fixed cross beams 3 and a series of mobile cross beams 4, all oriented according-to an axis orthogonal to the previous one, in particular along the axis Y. The cross beams mount a multiple number of item striking and blocking devices, indicated in the overall by the number 5 and described in further detail in FIG. 2.

The fixed cross beams 3 and the extremities of the mobile cross beams 4 also provide for a series of fixed striking elements 6, to be used for positioning the items, whenever needed.

Figure 2:
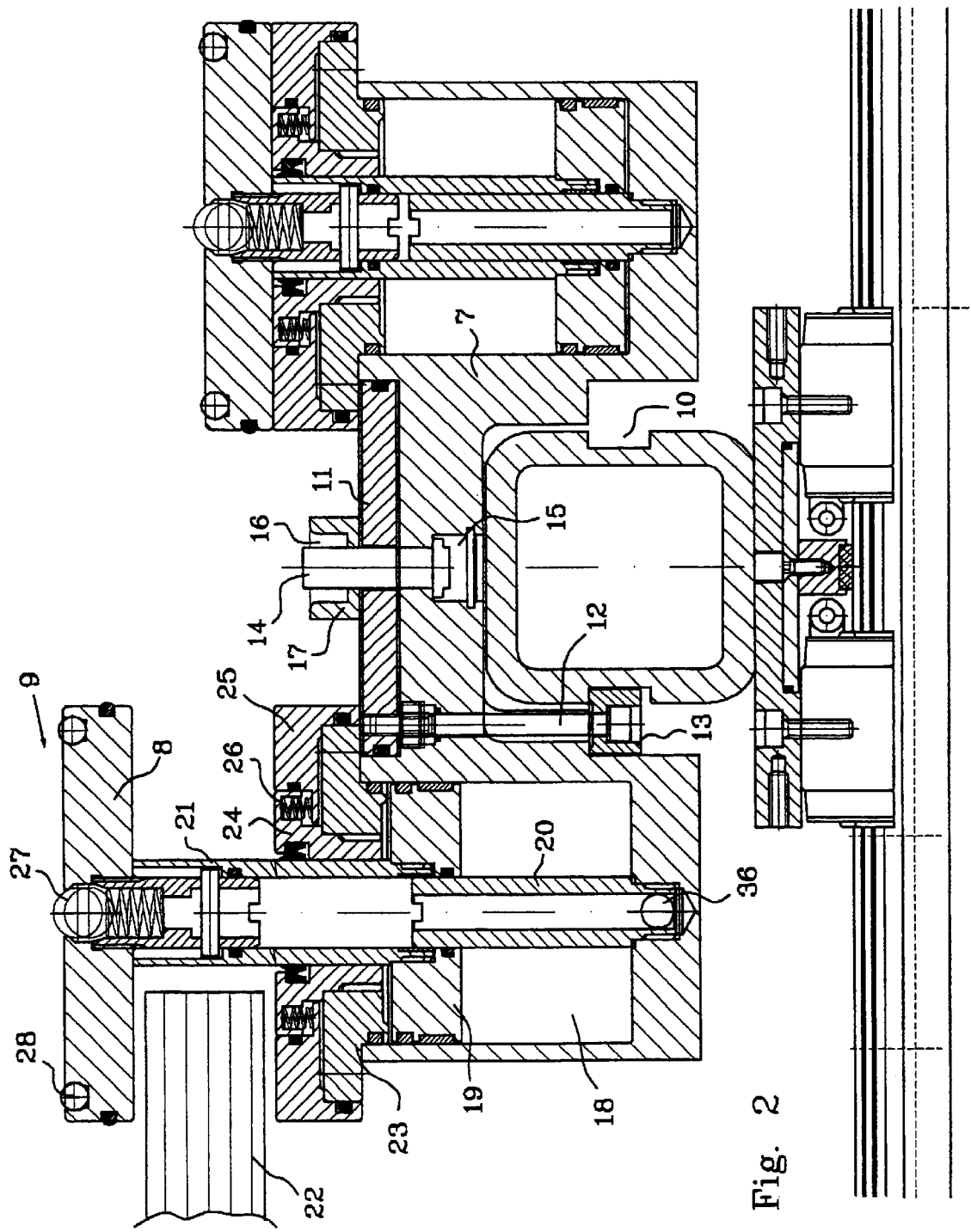
FIG. 2 is a cross section of the item striking and blocking devices of the machine according to the invention.
Figure 3:
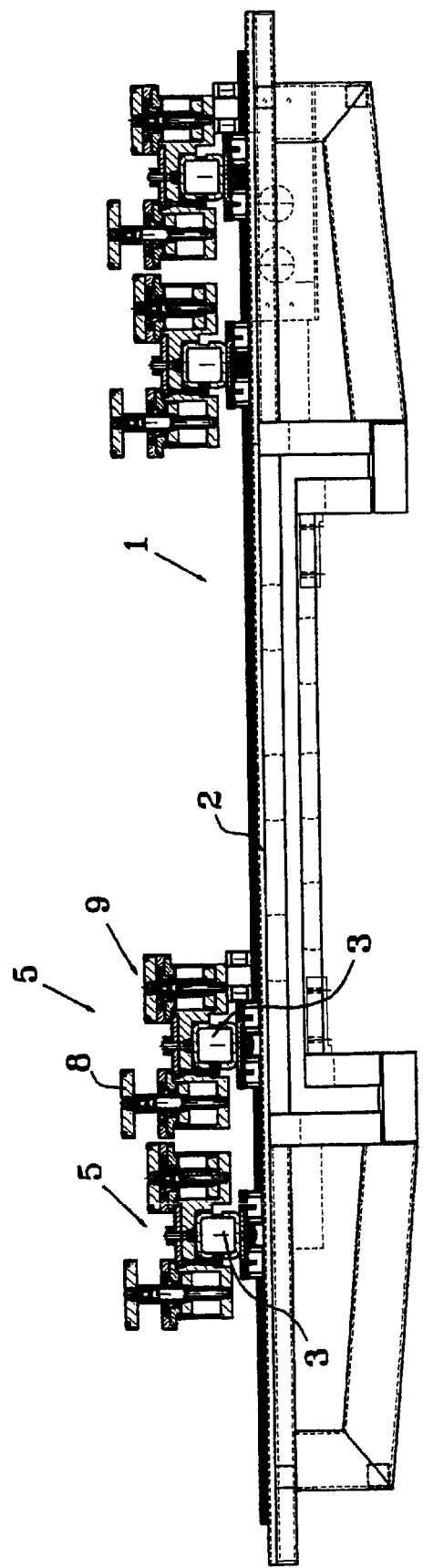
FIG. 3 is a vertical cross section of the working plane fitted with the striking and blocking devices.

The striking and blocking devices described in detail in the FIGS. 2 and 3, each comprise a support 7 mounting a pressing element 8 which presents some suction cups in its upper part.

The number 10 indicates a par of grooves provided in the lateral walls of the cross beams. The support 7 mounts a mobile vertical plate 11, which holds one or more screwed-on pairs of bolts 12, whose heads 13 refer to the grooves 10.

The thickness of the heads 13 is less than the depth of the grooves 10, so that the plate 11 is capable of effecting some small motions upward and downward, equal to the difference between the depth of the grooves 10 and the thickness of the heads 13.

The plate 11 is crossed by the rod of a piston 14, which slides inside a chamber 15 provided in the support 7.

The extremity of the rod 14 projects inside a seat 16, which is limited by a cylindrical wall 17 firmly attached to the plate 11.

Some devices of a known type, not shown in the figure, convey compressed air into the zone separating the support 7 and the plate 11.

The air pressure will normally keep the plate 11 pushed upward, while the head 13 of the bolts are locked against the upper wall of the grooves and block the support 7 on the cross beam.

In order to shift the support, it suffices to insert a pin into the seat 16 so as to push the piston down and to discharge the compressed air across the chamber 15, thus allowing the plate 11 to drop and unblock the support, which can thus freely slide along the cross beam.

The pin inserted into the seat 16 may for example be a pinmounted in the operating head of the machine, which may thus be used for properly positioning the fastening units on the working plane, or a pin mounted on a mobile support, as in a further preferred embodiment of the invention, which will be described later.

Each support 7 provides for two cylinders 18, each fitted with a piston indicated by the number 19, which slides along a central rod 20 inside the chamber 18.

The piston 19 is firmly attached to a sleeve 21, which also slides on the rod 20 and acts both as a striking element for positioning the item to be processed indicated by the number 22 on the working plane, as well as a support for the pressing element 8, used for blocking the item 22.

The cylinder 18 holding the sliding piston 19 is closed in its upper part by a wall or closing element 23, which acts as a guide for the sleeve 21 and presents its central portion, indicated by the number 24, projecting upward.

An annular element is provided above the wall 23 and around the projecting part 24, which is mobile in an essentially vertical direction and kept pressed downward by a pair of springs 26 or the like.

A non-illustrated duct conveys compressed air into the cylinder 18 above the piston 19, as well as into the annulus between the wall 23 and into the mobile annular element 25.

The same compressed air therefore draws the piston 19 downward, and pushes the annular element 25 upward.

A duct 36 axially crossing the rod 20 exits in its upper part opposite an opening provided in the pressing element 8, which is closed by a valve 27.

FIG. 4 offers a simplified view of another preferred embodiment of the invention, which provides for two working planes, indicated by the numbers 40 and 41, respectively.

Even in this case, each working plane includes the guides 2 with their cross beams 3 and 4, equipped with striking and blocking units 5.

Contrary to the previous embodiment, however, the motion of these units is induced, in addition to the pin mounted on the operating head and designed to fit into the seat 16 provided in the plate 11 of the support 7, by a separate device which comprises a guide 42 set parallel to one of the machine axes, for example parallel to the axis X, on which a support 43 moves, while mounting a piston actuating a pin or the like, to move in an essentially vertical direction, so as to insert itself into the seats 16 and cause the shifting of the blocking and fastening units.

In this case the motions along the axis X may be achieved by controlling the shift of the unit 43 along its guide 42, while the shifts in the direction of the axis Y may be achieved by controlling the motions of the working planes 40 and 41, respectively.

This configuration allows totally eliminating any dead periods, because as the operating heads performs the operations on a working plane, it is simultaneously possible to position a subsequent item on the other plane, by using the device 43 which takes care of properly positioning the various striking and blocking units.

Before the start of processing, it is moreover possible to simultaneously position the supports on both planes, by using the operating head for one of them, and the device 43 for the other. As will be clear from the above description, the method according to the invention then provides for the following phases:

positioning of one or more items against striking and blocking units on the working plane, positioning of the items against said striking and blocking units effected by the same, performing the expected processing work on the free edges of the items, positioning of further striking and blocking units against the edges of the item already processed, and blocking of the same, unblocking and removal of the first positioning and blocking units, completing the processing on the remaining edge of the item.

This has allowed achieving a tooling machine of an extreme flexibility, capable of processing items of various sizes and of complex shapes, while easily and rapidly adapting to the shape of the items, without any need for complex preparing operations, which would involve numerous dead time periods.

An expert of the trade may then provide various modifications and variants, all of which can however be deemed to fall within the scope of this invention.

What is claimed is:

1. A woodworking machine comprising a plurality of fastening devices for securing wooden items to be worked, means mounting said devices for movement in a working plane independently from each other, each of said devices constituting both an abutment element for positioning the item and means for securing the item to the device, wherein each of said devices comprises at least one pressing element mounted on a movable support, for movement in a direction perpendicular to said plane.

2. A machine as claimed in claim 1, wherein said pressing element has suction means for releasably holding an item thereon.

3. A machine as claimed in claim 1, comprising a plurality of beams parallel to each other mounted on guideways for movement in one orthogonal direction in said plane, said beams being also mounted for movement in said plane in a direction perpendicular to said one direction.

4. A woodworking machine comprising a plurality of fastening devices for securing wooden items to be worked, means mounting said devices for movement in a working plane independently from each other, each of said devices constituting both an abutment element for positioning the item and means for securing the item to the device, comprising a pair of parallel longitudinal guides (2), a plurality of cross beams (4) perpendicular to said guides (2) and mounted on said guides for movement along said guides in said longitudinal direction, and also for movement relative to said guides and relative to each other in a direction orthogonal to said longitudinal direction, each of said cross beams (4) supporting a plurality of individual holding devices (5), each of said holding devices being adapted to support and secure a portion of a wooden workpiece, wherein each said holding device (5) includes a vertically movable member (8) for releasably clamping a wooden workpiece (22).

5. A machine as claimed in claim 4, wherein said movable member (8) also has suction means thereon for releasably retaining a workpiece.

6. A machine as claimed in claim 4, said holding devices (5) being mounted in pairs on opposite sides of said cross beams (4) for conjoint movement along said cross beams.

* * * * *